Figure 1:
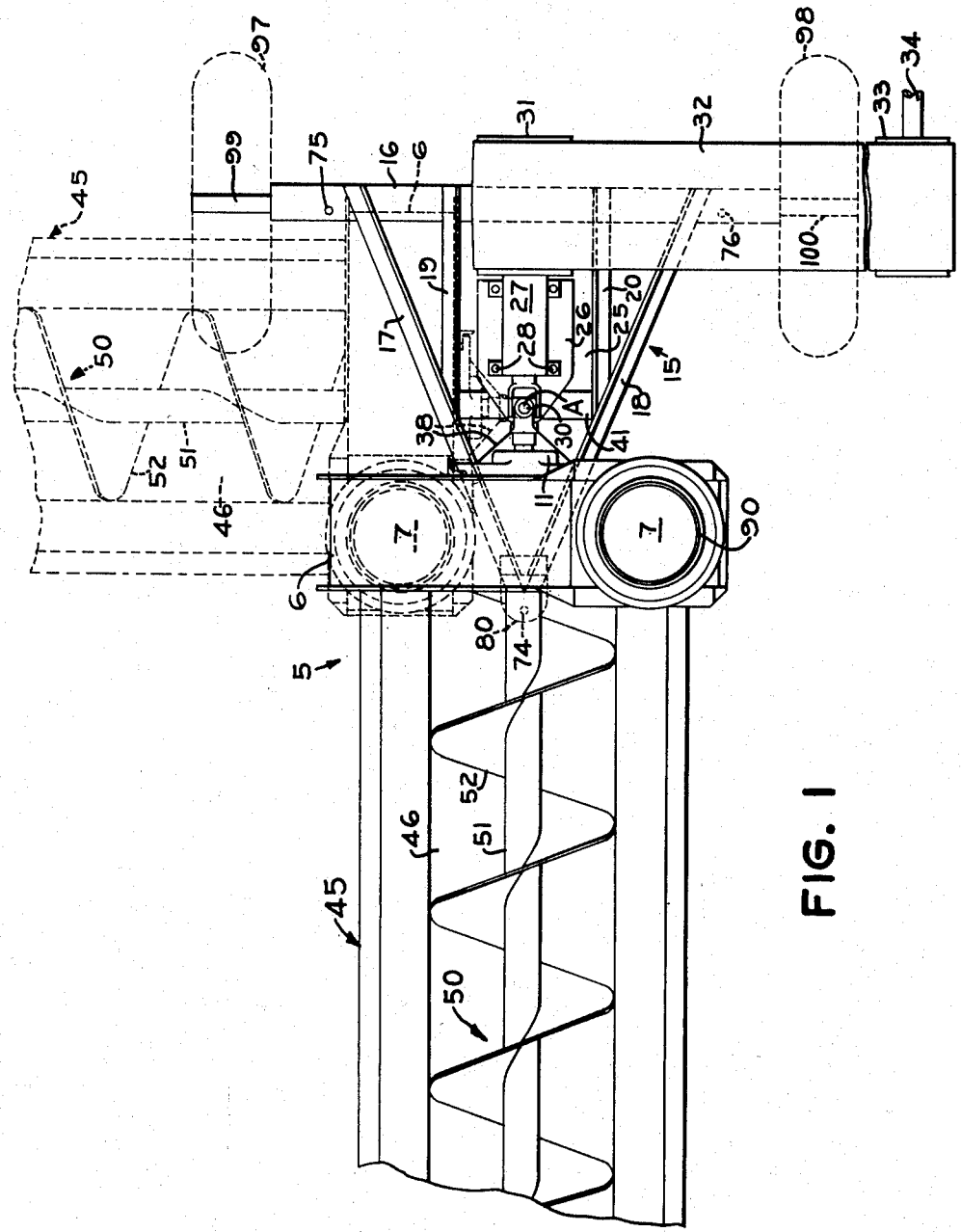

Aug. 26, 1952 G. B. HILL ET AL 2,608,445
BLOWER TYPE CONVEYER
Filed May 26, 1947 2 SHEETS—SHEET 1

INVENTORS
G. B. HILL & L. G. CHEATUM
BY
ATTORNEYS

Aug. 26, 1952 G. B. HILL ET AL 2,608,445
BLOWER TYPE CONVEYER
Filed May 26, 1947 2 SHEETS—SHEET 2
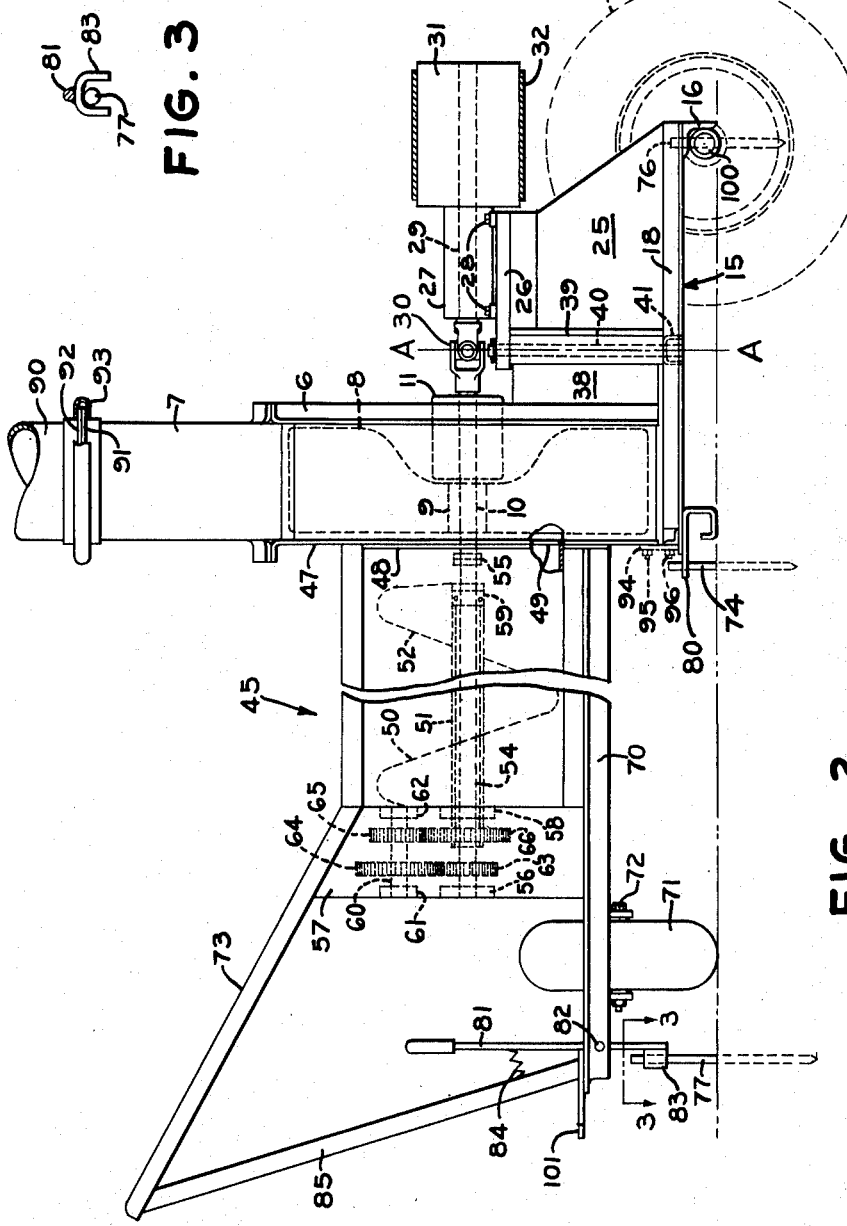
INVENTORS
G. B. HILL & L. G. CHEATUM
BY
ATTORNEYS Patented Aug. 26, 1952

2,608,445

UNITED STATES PATENT OFFICE 2,608,445

BLOWER TYPE CONVEYER

George B. Hill and Leo G. Cheatum, Ottumwa, Iowa, assignors to Deere Manufacturing Co., a corporation of Iowa Application May 26, 1947, Serial No. 750,564

2 Claims. (Cl. 302—37)

The present invention relates generally to blower type conveyors for elevating comminuted material such as chopped ensilage or hay into a silo or hay mow. Elevators of this class are usually provided with a feeder unit into which the chopped crops can be unloaded from the wagon or truck, the feeder unit being adapted to convey the crops into the intake of the blower. Inasmuch as it is customary to unload wagons and trucks by raising the front end and dumping the material out of the rear end of the body, it is customary to mount the feeder unit so that it can be swung either horizontally or vertically out of the path of the vehicle to permit the latter to move forwardly into dumping position, after which the feeder unit is swung back into normal feeding position behind the vehicle, thus avoiding the necessity for backing the wagon or truck into position.

The feeder unit conventionally comprises a trough extending axially away from the blower housing, with an auger in the trough driven by means of a suitable connection with the rotor of the blower. The blower, in turn, ordinarily receives power from a remotely located internal combustion engine or electric motor through a flat belt trained over a pulley on the blower shaft.

The design of the machine can be simplified by mounting the feeder unit rigidly on the blower housing and rotating the entire structure about a vertical axis on a supporting frame in order to swing the feeder out of the path of a vehicle. However, with a normally constructed blower the pulley on the blower shaft would thus be swung about the vertical axis, thereby dislodging the drive belt from the pulley and necessitating replacing of the drive belt every time the blower and feeder are returned to normal position after the passage of a vehicle. This operation involves a considerable expenditure of time and effort, for a drive belt of this type is large and heavy and operates under considerable tension. Other types of drives are sometimes used, such as multiple V-belts or chains and sprockets, but in any case it will be evident that considerable labor is necessary to restore the driving mechanism to its normal position after the blower has been swung through an angle of about 90 degrees and then returned to normal operating position.

The principal object of the present invention, therefore, relates to the provision of an arrangement for driving the conveyor, which arrangement is not disturbed by the swinging movement of the conveyor out of the path of the wagon or truck. In the accomplishment of this object, the drive pulley is mounted on a shaft journaled in a fixed support on the stationary frame, and the drive shaft is connected with the conveyor through a universal joint which lies substantially on the axis of horizontal swinging movement of the conveyor. This permits the blower and feeder unit to be shifted angularly without involving any movement of the drive shaft or pulley relative to its normal operating position, with the result that the drive arrangement is not disturbed when the conveyor is shifted to permit passage of the vehicle.

A further object relates to the provision of a novel and improved device for securing the combined elevator and feeder unit in its normal operating position to prevent any shifting movement of the implement about its vertical axis during the unloading of a wagon or truck into the feeder unit. In the accomplishment of this object, a simple form of locking means has been provided which engages an anchor stake driven into the ground in an appropriate location.

These and other objects and advantages of the present invention will be apparent to those skilled in the art after a consideration of the following description and drawings appended hereto, in which Figure 1 is a top plan view of a blower type elevator with an auger type feeder unit embodying the principles of the present invention, showing the machine in normal operating position in solid lines and showing in dotted lines the position of the machine when it is swung aside to permit the passage of a vehicle;

Figure 2 is a side elevational view of the machine in normal operating position with portions broken away to show details of construction; and Figure 3 is a sectional plan view taken along a line 3—3 in Figure 2 and showing on an enlarged scale the details of the locking device.

Referring now to the drawings, the machine is indicated in its entirety by reference numeral 5 and comprises material-handling means including a blower or rotor housing 6, generally cylindrical in shape and having a tangentially extending exhaust duct 7 rising therefrom. A blower rotor 8 within the housing 6 is provided with a hub 9 which is mounted on a driving member or rotor shaft 10. The shaft 10 is journaled within a bearing sleeve 11 mounted in the back wall of the housing 6 and projects therethrough to provide a terminal end portion that is associated with drive connections which will be explained later.

The blower housing 6 is proximate to a supporting unit in the form of a generally horizontal frame 15 comprising a main transversely disposed angle member 16 and a pair of outwardly converging angle members 17, 18 rigidly fixed to the angle member 16. A pair of parallel bracing members 19, 20 extend outwardly from the main transverse member 16 and are rigidly connected to the converging members 17, 18, respectively.

A pedestal 25 is rigidly supported between the parallel frame members 19, 20 and carries a mounting plate 26 on its upper end. A sleeve bearing 27 is rigidly fixed to the mounting plate 26 by suitable bolts 28. A driving member comprising a drive shaft 29 is journaled in the sleeve bearing 27 and has a terminal end portion thereof connected to the rotor shaft 10 through flexible driving means including a universal joint 30 disposed between the adjacent ends of the rotor shaft 10 and drive shaft 29. The outer end of the drive shaft 29 extends beyond the bearing 27 and supports a belt pulley 31, over which is trained a flexible endless power transmitting member in the form of a flat belt 32, which is trained over a drive pulley 33 driven through a shaft 34 connected to any suitable source of power, such as an engine crank shaft or the shaft of an electric motor. Preferably, the drive pulley 33 is the conventional belt pulley of a tractor. It is to be understood, however, that this invention is not limited to this particular type of flat belt drive, for other conventional power transmitting connections, such as V-belts or chains may be used without departing from the scope of this invention.

The blower housing 6 is mounted on a bracket 38, which is rigidly fixed to the back wall of the housing and which carries a vertical sleeve 39 journaled on a vertical pivot shaft 40. The shaft 40 is mounted in the supporting plate 26 at its upper end and at its lower end is supported on a transverse channel member 41 rigidly interconnecting the parallel frame members 19, 20. Thus, the blower is supported for horizontal angular movement about the vertical pivot axis AA of the pivot shaft 40, which axis extends upwardly through the universal joint 30 and intersects the common axis of the shafts 10 and 29. Hence when the blower housing 6 is shifted angularly, the universal joint 30 accommodates the angular movement of the rotor shaft relative to the driving shaft 29, for the latter remains stationary relative to the pedestal 25 and frame 15.

The material-handling means is provided with a feeder unit 45 in the form of a trough 46 extending axially or generally horizontally away from the forward side 47 of the housing 6 and is rigidly fixed to a flange 48 on the blower wall 47 by any suitable means, the blower and feeder being thus fixedly interconnected to provide a material-handling unit. The inner end of the trough 46 discharges into an intake opening 49 in the front wall 47 of the blower housing.

Disposed within the trough 46 is an auger conveyor 50 comprising a tubular supporting shaft 51 around which is wound a vane 52.

A drive shaft 54 is disposed coaxially within the auger shaft 51 and is connected by a coupling 55 at its inner end to the outer end of the rotor shaft 10. The opposite end of the drive shaft 54 is journaled in a bearing 56 disposed on the outer wall of a gear housing 57 at the outer end of the trough 46. The tubular auger shaft 51 is journaled in a bearing 58 mounted on the end wall of the trough 46 within the gear housing 57. The inner end of the tubular shaft 51 is carried on a bearing 59 which is mounted on the drive shaft 54 adjacent the coupling 55. A countershaft 60 within the gear housing 57 is journaled at its opposite ends in bearings 61, 62 supported within the housing 57 on the outer and inner walls thereof, respectively.

The drive shaft 54 drives the countershaft 60 through a pinion 63 mounted on the drive shaft 54 and in mesh with a gear 64 of comparatively larger diameter mounted within the gear housing 57 on the countershaft 60. The tubular auger shaft 51 is driven from the countershaft by means of a pair of intermeshing gears 65, 66 fixed to the countershaft 60 and the tubular shaft 51, respectively, and disposed within the gear housing 57. The gear 65 is smaller than the gear 66 so that the auger shaft 51 runs at a speed slower than that of the countershaft 60 and therefore considerably slower than the speed of the drive shaft 54 and rotor 8.

The trough 46 is carried on a horizontal supporting frame 70, which extends outwardly beyond the gear case 57 and which is mounted at its outer end on a wheel 71 journaled on an axle 72 which is substantially parallel to the axis of the drive shaft 54. A hopper or chute 73 above the gear case 57 and wheel 71 is inclined downwardly toward the end of the trough 46 to direct material into the trough.

The implement is secured in operating position by means of tie-down stakes, three of which 74, 75, 76 are used to anchor the frame 15 to the ground, and a fourth anchor stake 77 is disposed at the outer end of the feeder unit 45. The stake 74 is driven into the ground through an aperture in a bracket plate 80 which is rigidly fixed, as by welding, to the converged ends of the frame members 17, 18, and the other two stakes 75, 76 are driven through apertures in the transverse angle member 16. Thus, the frame 15, together with the pedestal 25 and drive shaft 29, is mounted on the ground in relatively stationary position. The outer end of the feeder unit frame 70 is detachably connected to the anchor stake 77 by means of a locking lever 81 disposed in substantially vertical position and pivotally mounted on the frame 70 on a transverse pivot pin 82. The lower end of the lever 81 carries a U-shaped clip 83 which is rigidly fixed thereto, as by welding. The U-shaped clip or channel element 83 is adapted to straddle the vertical stake 77 and the lever 81 is urged into locking position by means of a compression spring 84, which reacts against an upwardly extending frame member 85 that supports the outer end of the chute 73.

During operation, crops are fed from the trough 46 into the blower intake opening 49 by the auger 50 while the blower rotor 8 propels the crops upwardly in the discharge duct 7 and through a discharge pipe 90, which extends upwardly and delivers the crops to a silo or hay mow. The exhaust duct 7 and discharge pipe 90 have a pair of abutting flanges 91, 92, respectively, which are secured together by means of a collar 93 of U-shaped cross section which permits the two flanges to rotate about the axis of the pipe 90 relative to each other to permit a swiveling action between the pipe 90 and the duct 7 when the blower is swung about the vertical axis AA.

When a wagon or truck is ready to be emptied into the trough, the power is shut off from the drive pulley 33 to permit the rotor 8 to come to rest. The operator then releases the locking member 83 from the stake 77 by swinging the lever 81 in a counterclockwise direction, as viewed in Figure 2, after which he shifts the feeder 45 and blower 6 angularly about the vertical axis AA, the outer end of the feeder unit 45 being carried on the wheel 71 during the angular movement. The rotor shaft 10 swings angularly relative to the drive shaft 29 about the axis AA through the universal joint 30 as the feeder shifts into the position shown in dotted lines in Figure 1. After the loaded truck is brought up into position the feeder is swung back about the vertical axle AA into the operating position shown in solid lines, and secured in that position by engaging the channel locking device 83 with the stake 77. During this angular movement, the discharge pipe 90 does not turn with the exhaust duct 7, because of the swiveling movement between the flanges 91, 92, although the discharge pipe 90 is shifted laterally a short distance as the feeder swings angularly.

The machine is prepared for transport by rigidly connecting the blower housing 47 to the frame 15. This is accomplished by bolting a locking plate 94 to the housing 6 by means of a bolt 95 and also bolting the plate 94 to a part on the frame member 17, 18 by means of a bolt 96. The anchors 74—77 are removed and the frame 15 is jacked up and mounted on a pair of transport wheels 97, 98, for the purpose of which a pair of stub axles 99, 100 are fixed at opposite ends of the main transverse beam 16, respectively. The plate 94 and the transport wheels 97, 98 are shown in dotted lines, inasmuch as they are taken off the machine during operation. The machine is drawn on its transport wheels 97, 98 by means of draft plate 101 which is rigidly fixed to the outer end of the trough frame 70 and is adapted to be connected to a tractor drawbar or the like, by any suitable connecting means (not shown).

We claim:

1. A machine of the class described, comprising: a first supporting unit adapted to rest in a relatively stationary position on the ground or floor; material-handling means including a rotor housing formed about a generally horizontal axis, and a generally horizontal feeder leading into the housing, said housing and feeder being fixedly interconnected to provide a second unit normally positionable with the rotor housing proximate to and the feeder extending away from the supporting unit; means interconnecting the units for swinging of the second unit relative to the supporting unit about a generally vertical axis that substantially intersects the rotor axis; a rotor in the housing on the horizontal axis thereof and having a driven member projecting axially outwardly of the housing toward the supporting unit to provide a terminal end portion proximate to the vertical pivot axis; a driving member journaled on the supporting unit on a horizontal axis that is coaxial with the rotor axis when the units are normally positioned as aforesaid, and having a terminal end portion proximate to the terminal end portion of the driven member at the vertical pivot axis; and means drivingly interconnecting said terminal end portions, including a flexible joint coaxial with the member axes and with the pivot axis and providing for horizontal angular displacement of the driven member relative to the driving member as the second unit is swung about said pivot axis relative to the supporting unit.

2. The invention defined in claim 1, further characterized in that: the second unit has thereon movable locking means selectively engageable with and disengageable from a ground-borne anchor for respectively locking the second unit against, and releasing the second unit for, swinging relative to the supporting unit.

GEORGE B. HILL.
LEO G. CHEATUM.

REFERENCES CITED

The following references are of record in the file of this patent:

UNITED STATES PATENTS

| Number | Name | Date |
| --- | --- | --- |
| 2,324,042 | Swenson | July 13, 1943 |
| 2,373,169 | Coultas | Apr. 10, 1945 |
| 2,405,695 | Hitchcock | Aug. 13, 1946 |